Feb. 18, 1969  O. C. NIEDERER  3,428,162
EGG HANDLING EQUIPMENT
Filed Oct. 5, 1966  Sheet _1_ of 2
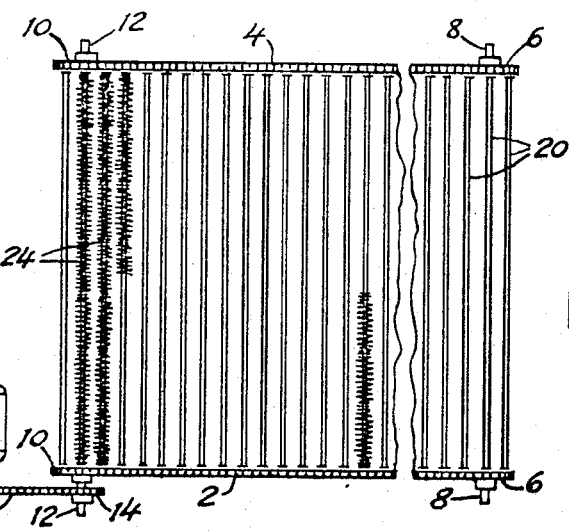
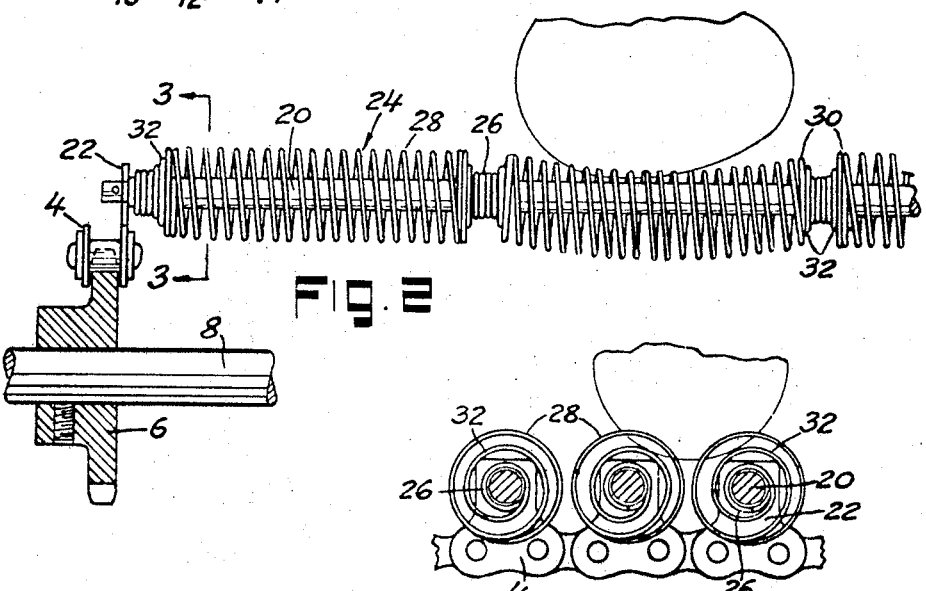
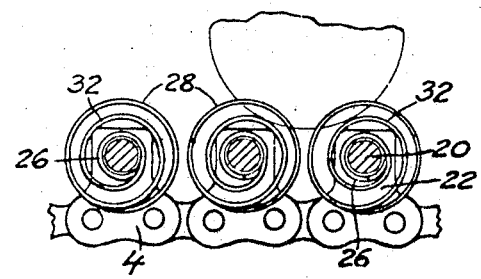
INVENTOR.
OTTO C. NIEDERER
BY Sperry and Zoda
ATTORNEYS United States Patent Office 3,428,162
Patented Feb. 18, 1969

3,428,162
EGG HANDLING EQUIPMENT
Otto C. Niederer, Bear Tavern Road,
Titusville, N.J. 08560
Filed Oct. 5, 1966, Ser. No. 584,581
U.S. Cl. 198—33         5 Claims
Int. Cl. B65g 17/30, 39/06

ABSTRACT OF THE DISCLOSURE

A support and conveyor for use in egg handling equipment wherein coiled spring elements surround parallel rods with the coiled spring elements being provided with bearing portions of relatively small diameter engaging the rods and egg engaging portions which are substantially larger in diameter, the egg engaging portions of the coiled spring elements being connected to the bearing portions thereof by yieldable means in the form of spaced turns of wire located in planes extending substantially normal to the axes of said rods and bearing portions of the coiled spring elements.

---

This invention relates to conveyors and supports adapted for use in egg handling equipment and is directed particularly to constructions embodying coiled spring elements which are formed to present yieldable egg supporting or egg positioning surfaces upon which the eggs are located so as to reduce or eliminate checking, cracking or damage to the eggs.

In U.S. Patent No. 3,148,761 egg supporting and handling means are shown and described wherein a conveyor is provided with transversely extending rods having coiled spring members surrounding the rods. The coiled spring members on adjacent rods have portions of reduced diameter which cooperate to define egg receiving recesses. Such conveyors have been used extensively in various types of egg handling equipment. However, those portions of the coiled spring members which are of reduced diameter have less resiliency than those portions thereof which are of relatively large diameter. As a result, the egg receiving recesses of such conveyors are not always sufficiently yieldable to prevent injury to thin shelled and other eggs supported on the conveyor, particularly when the eggs are subjected to contact with cleaning means or the like which tend to urge the eggs toward the conveyor or into the recesses. Moreover, it is often necessary or desirable to deposit or transfer eggs onto a yieldable surface on a support or conveyor and to allow the eggs to move about thereon instead of positioning the eggs in predetermined locations.

In accordance with the present invention egg supporting and conveying means are provided with coiled spring elements of novel configuration which serve to present cushioned and yieldable surfaces or cavities which are so formed as to permit eggs to be discharged or transferred onto the same without injury thereto and to afford such yielding action in the event the eggs are engaged by elements which tend to urge the eggs downward toward the conveyor.

These results are preferably attained by providing egg conveyors or supporting means with parallel rods having coiled spring elements thereon presenting portions of relatively small diameter for bearing engagement with the rods to hold the spring elements in horizontal positions and to prevent sagging of the elements. On the other hand the coiled springs are provided with portions of relatively large diameter wherein the turns of the wire or material of which the springs are formed are spaced apart and relatively movable to afford a yielding and cushioning action. Moreover the cushioning portion of the coiled springs may present a concave egg engaging surface for cooperation with adjacent coiled spring members to define egg receiving cavities.

Accordingly the principal objects of the present invention are to reduce the damage or injury to eggs which are deposited on an egg conveyor or support; to provide egg supports or conveyors with more yieldable egg receiving surfaces, and to provide conveyors or supports for eggs with coiled spring elements of novel design and configuration.

A specific object of the invention is to provide equipment embodying egg supporting or conveying means with assemblies comprising parallel transversely extending rods with coiled spring elements presenting bearing portions of relatively small diameter engageable with the rods, and other portions of relatively larger diameter which present yieldable egg engaging surfaces which may if desired be concave and cooperate to form egg receiving recesses.

These and other objects and features of the invention will appear from the following description thereof wherein reference is made to the figures of the accompanying drawing.

In the drawing:

FIG. 1 is a plan view of a typical conveyor embodying the present invention;

FIG. 2 is an enlarged view of a portion of the conveyor illustrated in FIG. 1;

FIG. 3 is a sectional view taken on the line 3—3 of FIG. 2;

Figure 4:
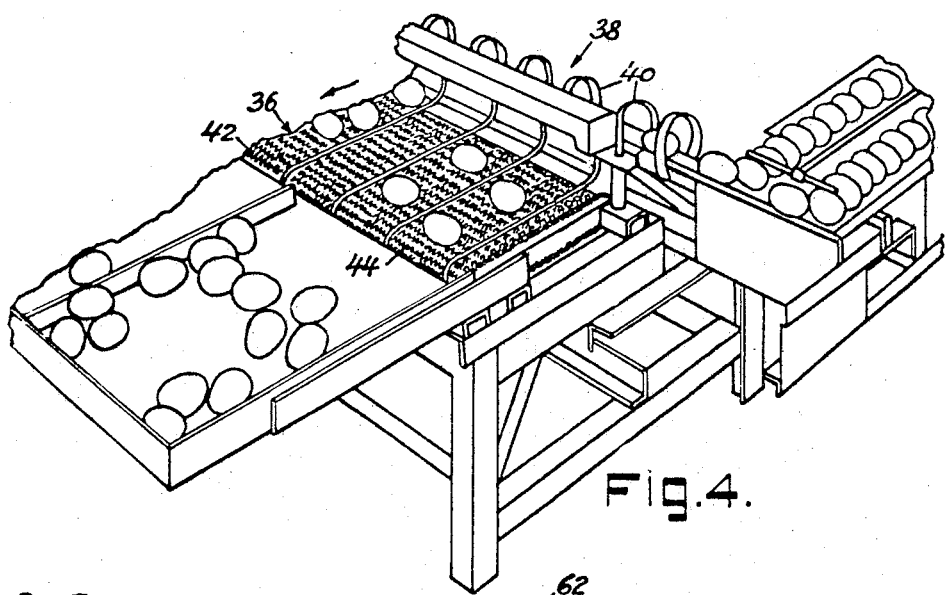
FIG. 4 is a perspective illustrating a portion of typical egg handling equipment embodying a conveyor of the type shown in FIGS. 1 and 2.

In that form of the invention chosen for purposes of illustration in FIGS. 1, 2 and 3 of the drawing, the conveyor or support embodies spaced parallel side members such as chains 2 and 4 which pass about sprockets 6 on a shaft 8 at one end of the conveyor and sprockets 10 secured to shaft 12 at the other end thereof. The conveyor is advanced as desired by suitable drive means such as the sprocket 14 which is secured to shaft 12 and driven by suitable means such as a chain 16 and motor 18. The conveyor or support is provided with a plurality of parallel rods 20 which are secured at their opposite ends to the side members or chains 2 and 4 by suitable means such as lugs 22. Coiled spring elements indicated generally at 24 surround the rods 20 and may extend throughout substantially the entire length thereof.

The coiled spring elements 24, as shown in FIG. 2, surround the rods 20 and are provided with bearing portions 26 which are but little larger in diameter than the rods 20 and may directly engage the rods. The turns of wire forming the bearing portions 26 of the coiled spring elements are preferably substantially uniform in diameter and may be in direct contact with each other so as to form a relatively stiff tubular section rotatable with respect to the rods 20. The bearing portions 26 cooperate with the rods 20 to hold the coiled spring elements 24 in a horizontal position on the conveyor so as to prevent sagging thereof.

The egg engaging portions 28 of the coil spring elements 24 are substantially larger in diameter than the bearing portions 26 thereof and embody a plurality of turns of wire which are spaced apart and capable of relative movement with respect to each other. The egg engaging portions 28 of the coiled spring elements are therefore yieldable to provide a cushioning action permitting eggs to be discharged onto the same without injury.

The ends 30 of the egg engaging portions 28 of the coiled spring elements are preferably connected to the bearing portions 26 thereof by flexible means such as a plurality of turns of wire 32 which are disposed in a plane extending substantially radially with respect to the rods 30. The turns of wire 32 are also relatively movable with respect to each other as shown in FIG. 2 whereby they serve to provide a resilient, tiltable, and flexible connection between the bearing portion 26 and egg engaging portion 28 which serves to increase the yielding and cushioning action of the egg engaging portion 28 upon contact of an egg therewith.

Further as shown in FIGS. 1 and 2, the egg engaging portions 28 of the coiled spring elements 24 are composed of spaced turns of wire which are substantially uniform in diameter so that they cooperate to present a substantially cylindrical surface. Moreover the ends of adjacent egg engaging portions of the coiled spring elements are positioned relatively close together so that the spaces between said ends are substantially less than the diameter of the eggs to be handled. The spacing of the coiled spring elements in a direction lengthwise of the conveyor, in any event, should of course be substantially less than the diameter of the eggs being handled. If desirable, and particularly when the elements of the assemblies are employed primarily as a yieldable egg support, the spacing of the elements lengthwise of the conveyor and the diameter of the egg engaging portions thereof may be so limited as to present a generally flat surface over which the eggs may move relatively freely. However for egg conveying purposes the longitudinal spacing of the elements should be such that the surface of the conveyor has a transversely ribbed effect which serves to cause the eggs to be advanced with the conveyor.

The constructions thus provided are particularly adapted for use in egg handling equipment wherein eggs are discharged or transferred onto the support or conveyor as exemplified in FIG. 4. As there shown a "take-away conveyor" 36 is employed in combination with egg grading equipment 38 in an assembly such as that shown and described in U.S. Patent No. 2,843,250. In such equipment eggs are graded by weight and are discharged onto the conveyor 36 upon the tilting of the weighing devices 40. In the event the eggs being graded by such equipment includes some thin shelled eggs, there is always a danger that the eggs may be checked or cracked by even the limited impact resulting discharge thereof onto rubber covered or other rods or surfaces of conventional conveyors. However, in accordance with the present invention, and as shown in FIG. 4, the coiled spring elements 42 of the conveyor 36 are formed and arranged so that the yieldable egg engaging portions 44 thereof are aligned with the scales or egg discharging means of the egg handling equipment. In this way a resilient and yieldable cushioning surface is presented at the points where eggs are to be discharged onto the conveyor and the checking or damaging of eggs is reduced to a minimum.

Figure 5:
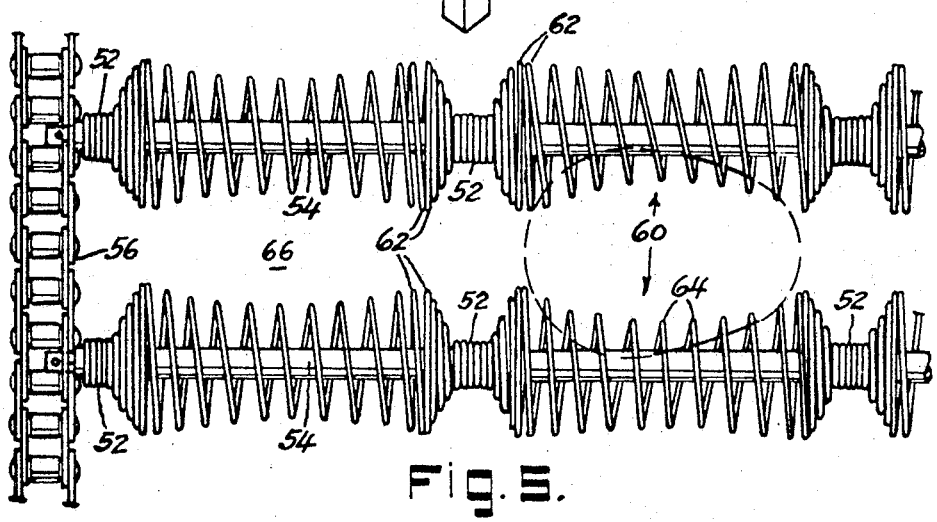
FIG. 5 is a view similar to FIG. 2 illustrating a portion of an alternative embodiment of the present invention.

In the alternative form of the present invention shown in FIG. 5 the coiled spring elements 50 are provided with the bearing portions 52 which surround supporting rods 54 carried by the chains 56 of a conveyor. However, the egg engaging portions 60 of the coiled spring elements, instead of being substantially cylindrical as shown in FIGS. 1, 2 and 3, present concave surfaces wherein the end turns 62 of the egg engaging portion are of larger diameter than the central turns 64 of the egg engaging portion. In this way adjacent coiled spring elements on the conveyor cooperate to present cushioned egg receiving cavities 66 which are located between the bearing portions 52 and serve to hold the eggs on the conveyor in predetermined positions or rows extending transversely of the conveyor.

Conveyors embodying the present invention, and particularly that form thereof shown in FIG. 5, are of outstanding advantage when used in equipment wherein the eggs may be urged toward the conveyor during handling thereof. Thus, for example, the conveyors may be used in egg cleaning equipment wherein brushes or abrasive means are moved or urged into engagement with eggs supported on the conveyor. The cushioning and yieldable support of the eggs then serve to reduce the impact or pressure to which the eggs are subjected whereby breakage or damaging of the eggs is materially reduced.

The present invention is further adapted for use in equipment of the type shown and described in said U.S. Patent No. 3,148,761 wherein the length of the coiled spring elements are varied by engagement of the ends thereof with inclined surfaces at opposite sides of the conveyor to vary the spacing and relative location or positions of the eggs on the conveyor during longitudinal movement of the conveyor.

While the coiled spring elements are preferably formed as a single, integral wire winding, it will be apparent that the flexible connecting means by which the bearing portions of the elements are secured to the egg engaging portions thereof may be formed as separate elements attached to said portions in any suitable manner. Similarly the outer egg engaging portions, or the entire coiled spring elements may be provided with a nickel or chromium plating or be otherwise coated if desired.

In view thereof it should be understood the numerous changes and modifications may be made in the form, construction and arrangement of the various elements of the combination and accordingly the particular embodiments of the invention shown in the drawing and described above are intended to be illustrative only and are not intended to limit the scope of the invention.

I claim:

1. In a conveyor for use in egg handling equipment wherein the conveyor has spaced side chains with a plurality of parallel rods secured to said chains and extending transversely to the conveyor, the combination of coiled spring elements surrounding said rods and supported thereby, said coiled spring elements having a plurality of transversely spaced bearing portions consisting of a plurality of turns of wire of relatively small diameter surrounding and engaging said rods, yieldable egg engaging portion consisting of spaced turns of wire, said turns being of substantially larger diameter than said bearing portions and interposed between said bearing portions of the coiled spring element, flexible connecting means extending from said bearing portions to said egg engaging portions adjacent the ends of the bearing portions of said coiled spring elements and consisting of a plurality of spaced turns of wire located in a plane substantially normal to said rods and said bearing portions of the coiled spring element, and drive means operatively connected to said chains to advance said conveyor.

2. The combination as defined in claim 1 wherein the turns of wire forming said egg engaging portions of the coiled spring element are of substantially uniform diameter and cooperate to present a substantially cylindrical egg engaging surface.

3. The combination as defined in claim 1 wherein the egg engaging portions of the coiled spring elements embody spaced turns of wire of larger diameter adjacent the ends thereof than in between said ends and cooperate to prevent a concave egg engaging surface, and the concave surfaces of the egg engaging portions of coiled spring elements or adjacent rods are aligned and cooperate to define egg receiving cavities.

4. In egg handling equipment embodying the combination as defined in claim 1 egg discharging means located above and in alignment with the egg engaging portions of said coiled spring elements.

5. In egg handling equipment embodying the combination as defined in claim 1 a plurality of egg discharging means located at predetermined points located above and spaced transversely of said coiled spring elements in alignment with the egg engaging portions thereof, and said drive means is operable to convey eggs away from said egg discharging means.

References Cited

UNITED STATES PATENTS

| | | | |
|---|---|---|---|
| 3,147,844 | 9/1964 | Mountz | 198—34 |
| 3,148,761 | 9/1964 | Niederer et al. | 198—33 |

EVON C. BLUNK, *Primary Examiner.*

U.S. Cl. X.R.

198—183